(12) United States Patent
Deneire et al.

(10) Patent No.: US 6,990,061 B2
(45) Date of Patent: Jan. 24, 2006

(54) METHOD AND APPARATUS FOR CHANNEL ESTIMATION

(75) Inventors: Luc Deneire, Mélin (BE); Patrick Vandenmeele, Leuven (BE)

(73) Assignees: Interuniversitair Micro-Elektronica Centrum, Leuven (BE); National Semiconductor Corporation, Santa Clara, CA (US)

( * ) Notice: Subject to any disclaimer, the term of this patent is extended or adjusted under 35 U.S.C. 154(b) by 842 days.

(21) Appl. No.: 09/871,571

(22) Filed: May 30, 2001

(65) Prior Publication Data
US 2002/0034161 A1   Mar. 21, 2002

Related U.S. Application Data

(60) Provisional application No. 60/208,447, filed on May 31, 2000.

(51) Int. Cl.
*H04J 11/00* (2006.01)
*H04J 3/14* (2006.01)
*H04L 12/26* (2006.01)
*G08C 15/00* (2006.01)
*G06F 11/00* (2006.01)

(52) U.S. Cl. .............. 370/210; 370/203; 370/252; 375/224; 375/355

(58) Field of Classification Search ........ 370/203–210, 370/341–345, 480–503; 375/219–222, 260–296, 375/340–343; 714/708, 795
See application file for complete search history.

(56) References Cited

U.S. PATENT DOCUMENTS 5,355,431 A * 10/1994 Kane et al. ................. 704/226
5,905,743 A * 5/1999 Ramesh ...................... 714/795
5,912,876 A * 6/1999 H'mimy ...................... 370/210
6,097,776 A * 8/2000 Mesiwala .................... 375/355
6,298,035 B1 * 10/2001 Heiskala ..................... 370/206
6,473,393 B1 * 10/2002 Ariyavisitakul et al. .... 370/203
6,487,253 B1 * 11/2002 Jones et al. ................. 375/260
6,591,284 B1 * 7/2003 Brockmeyer et al. ....... 708/400
6,678,339 B1 * 1/2004 Lashkarian ................. 375/341
6,760,300 B1 * 7/2004 Eberle et al. ............... 370/210
6,768,714 B1 * 7/2004 Heinonen et al. .......... 370/208
6,795,392 B1 * 9/2004 Li et al. ..................... 370/210
6,826,240 B1 * 11/2004 Thomas et al. ............. 375/340

OTHER PUBLICATIONS

Choi, "Channel Estimation for Coherent Multi-Carrier CDMA Systems Over Fast Fading Channels" (2000) IEEE 51st vol. 1 of 3 pp. 400-404.
Beek et al., "On Channel Estimation in OFDM Systems", (1995) IEEE US vol. 2 Conf. 45 pp. 815-819.
Reddy et al., "On Equalizaion for OFDM-Dedicated Short Range Communication (DSRC) Modem", (2000) IEEE pp. 230-234.

(Continued)

*Primary Examiner*—Man U. Phan
(74) *Attorney, Agent, or Firm*—Knobbe, Martens, Olson & Bear LLP

(57) ABSTRACT

This invention relates to a method and apparatus for channel estimation. A method of determining a maximum likelihood frequency domain estimate of the channel response of a channel between at least one transmitting peer and at least one receiving peer, the method comprising transmitting $N_U$ reference tones from the transmitting peer to the receiving peer; capturing the $N_U$ reference tones at the receiving peer; and determining at the receiving peer from the $N_U$ reference tones the maximum likelihood frequency domain estimate of the channel response at $N_F$ predetermined frequencies by directly exploiting the finiteness of the time response of the channel.

29 Claims, 13 Drawing Sheets

OTHER PUBLICATIONS

Edfors, O., et al. "OFDM Channel Estimation by Singular Value Decomposition", IEEE Transactions on Communications, 46(7):931-939, (Jul., 1998).

He, S., et al., "Computing Partial DFT for Comb Spectrum Evaluation", IEEE Signal Processing Letters, 3(6): 173-175, (Jun., 1996).

Jones, V.K., et al., "Channel Estimation for Wireless OFDM Systems", IEEE Global Telecommunications Conference, 2:980-985, (Nov., 1998).

Raleigh, G.G., et al., "Multivariate Modulation and Coding for Wireless Communication", IEEE Journal on Selected Areas in Communications, 17(5) 851-866, (May 1999).

* cited by examiner

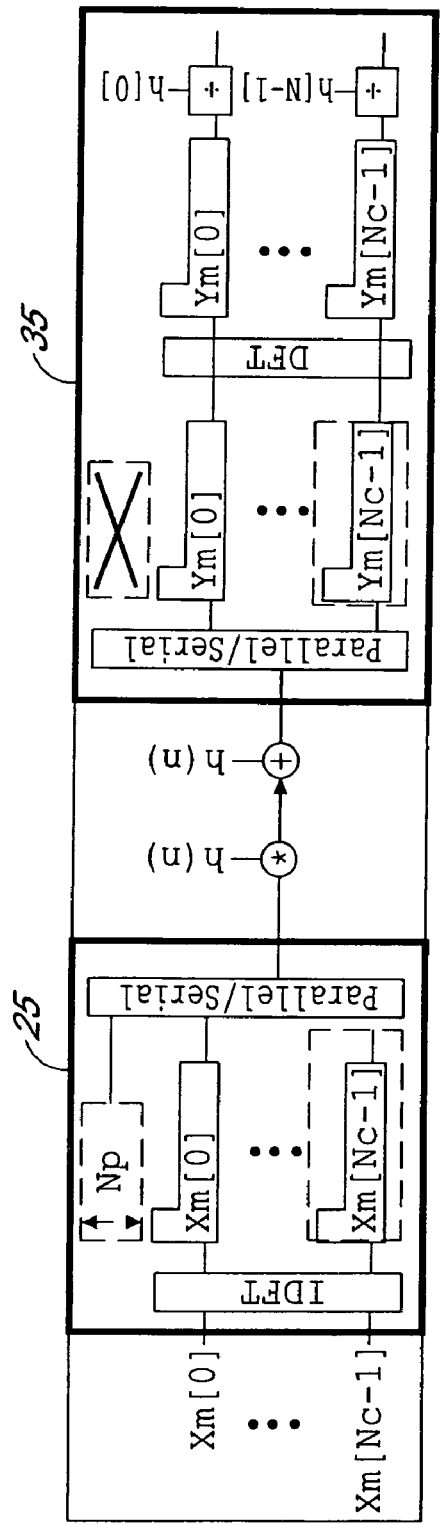
FIG. 1 OFDM System
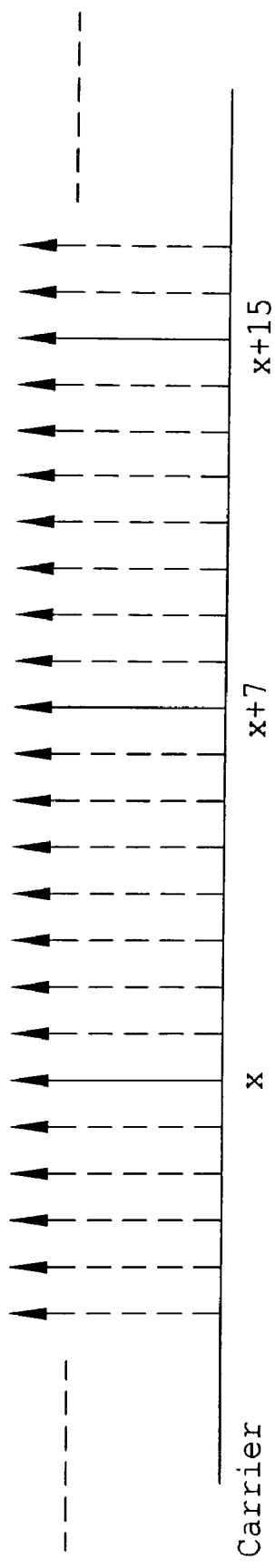
FIG. 2 Comb spectrum for Nc/Nhe = 8

METHOD AND APPARATUS FOR CHANNEL ESTIMATION

This application claims priority from and incorporates by reference, in its entirety, U.S. Provisional Application No. 60/208,447, entitled 'METHOD AND APPARATUS FOR CHANNEL ESTIMATION,' filed May 31, 2000.

FIELD OF THE INVENTION

The invention relates to modem telecommunication methods wherein equalization is exploited and channel estimation is needed.

BACKGROUND OF THE INVENTION

In telecommunication systems, wherein transmission from at least one transmitting peer to at least one receiving peer is considered, knowledge of the channel between said transmitting peer and said receiving peer, can be necessary for or be used for improving the determining of the transmitted signal at the receiving peer. Said signal improving process is also denoted equalization. Said channel knowledge can be obtained by performing a channel estimation, meaning determining the frequency response of said channel.

In telecommunication methods based on subband processing one typically considers a channel with Nc carriers. Note that in subband processing of a data signal having a data rate, comprises in principle of splitting said data signal in a plurality of data signals, with a lower data rate and modulating each of said plurality of data signals with another carrier. Said carriers are preferably orthogonal. Channel estimation for channels with multiple carriers boils down to determining the channel frequency response at the frequencies of said carriers or at a subset thereof. Note that in modem wireless telecommunication methods the channel time domain response is short, thus having a finite time domain response, meaning a finite amount of non-zero samples.

An example of a modem telecommunication method is Orthogonal Frequency Division Multiplexing (OFDM), which has become increasingly popular during the last decades, mainly because it provides a substantial reduction in equalization complexity compared to classical modulation techniques. Indeed, OFDM with cyclic prefix can be equalized by a single low-rate complex multiplication on each carrier. For this reason, it has been adopted in the upcoming standards for high data-rate wireless networks, such as ETSI Hiperlan II and IEEE 802.11a. As opposed to former standards using OFDM modulation, the new standards rely on coherent QAM modulation and thus require channel estimation. Hence, the complexity of channel estimation is of crucial importance, especially for time varying channels, where this has to be performed periodically or even continuously.

Channel estimation can be performed during reception of information or data between the transmitting and receiving peer, which is denoted blind channel estimation or by transmitting specific information, also denoted reference tones, between said peers. Although the invention focuses towards non-blind channel estimation, it is clear that a combination with blind channel estimation is possible.

When relying on transmission of said specific information or reference tones, it is clear that it is beneficiary if one can estimate the channel frequency response at the frequencies of its carriers or at a subset thereof from only a limited set of reference tones, meaning less reference tones than the amount of carriers. In the context of multi-user transmission schemes, wherein each user transmits from a different transmitting peer towards at least one receiving peer, one is even obliged to use only a limited set of reference tones per user, if one wants to determining channel frequency responses of each of the users simultaneously. One can then for each user use a different set of reference tones, preferably scrambled all over the spectra of the channel. This scrambling is also denoted interleaving.

Note that as non-blind channel estimation invokes transmission of specific information, which is in fact non-useful data from a users point of view, channel estimation is considered as an overhead, which should be efficient, meaning taking a small amount of time, thus a minimal amount of reference tones, but also an efficient implementation, meaning taking a small amount of operations in order to determine the channel estimate, resulting in a fast determination and taking a small area in chip implementations. However, although complexity reduction is aimed at, still optimality of the estimation operation is an important feature.

It must be emphasized that in the modem telecommunications standards, using multi-carriers approaches, the reference tones used for channel estimation can not be chosen to be equidistant as said standards define certain carriers to be zero carriers, meaning not to be used for transmission. Indeed the standards use some zero-carriers for spectral shaping, for example, some carriers are not used to allow smooth decaying of the spectral power on the border of the bandwidth. Hence, these standards (and possible variations) will be referred to as spectral shaping systems.

Existing literature recognizes that, due to the structure of OFDM signals, the channel can be estimated by using the frequency correlation of the channel. This frequency correlation has inspired different approaches. Edfors et al. [O. Edfors, M. Sandell, J. J. van de Beek, S. K. Wilson, and P. O. Borjesson. "OFDM Channel Estimation by Singular Value Decomposition," IEEE Trans. on Communications}, 46(7):931–939, July 1998.] use explicitly the frequency correlation and derive a linear minimum mean squared (LMMSE) estimator. Using optimal rank reduction, they develop a low complexity algorithm which computes an approximated LMMSE estimator. Complexity is here a trade-off with optimality. Raleigh and Jones [G. G. Raleigh and V. K. Jones. "Multivariate Modulation and Coding for Wireless Communication," IEEE Journ. on Special Areas in Communications, 17(5):851–860, May 1999.] link the frequency correlation to the maximum delay spread and estimate the channel from a part of the carriers only. These carriers must be regularly spaced, which limits the application of their method.

It can be stated that prior-art channel estimation methods can not cope with non-equidistant reference or pilot tones, required by modem standard. Complexity reduction of the prior-art channel estimators leads to loss of optimality.

SUMMARY OF THE INVENTION

It is a first aspect of the invention that a channel estimation method is presented with provides a maximum-likelihood estimate of the frequency response of the channel. A channel between at least one transmitting peer and at least one receiving peer is considered. $N_U$ reference tones are transmitted. Said maximum-likelihood frequency domain estimation operation is such that the finiteness of the time domain response of the channel is explicitly exploited, resulting in both an optimal but still a low complexity approach. The method can deal with multi-carrier channels with $N_C$ carriers and works also when the amount of reference tones $N_U$ is less than $N_C$. Note that with multi-carrier channel is meant a plurality of subchannels, each subchannel being centered around a carrier. Reference tones can be associated with a subchannel or a carrier.

In an embodiment of the invention it is recognized explicitly that the determining of a maximum-likelihood estimate can be performed in the time domain. Therefore one recognizes a transformation of the received or captured reference tones from the frequency domain into the time domain, a time domain estimation step and a back transformation of the obtained time domain estimates to the frequency domain.

In a further embodiment one recognizes that said transformations can be performed by applying IFFT and FFT operations, which can be efficiently implemented. Moreover the maximum-likelihood estimate determination is shown to be an efficient operation also, as it can be done by making linear combinations of the reference tones, requiring an amount of multiplications of the order of $N_H^2$, with $N_H$ the amount of non-zero valued time samples of the impulse response of the channel, which is typically small in subband processing telecommunication schemes such as OFDM used for wireless indoor communications. Note that said complexity reduction does not result in lack of optimality. The estimate of the channel retains to be a maximum-likelihood estimate.

In an embodiment of the invention the applicability of the method also in case of non-equidistant reference tones is established.

In an embodiment of the invention the exploitation of the finiteness of the time domain response of the channel is made explicit by characterizing the dimensions of the operations to be performed, more in particular the subband and inverse subband processing, or in case of OFDM the FFT and IFFT operations. Also the weighting of the time domain measurements, being the transformed captured reference tones, used to obtain the maximum likelihood frequency domain estimates, is characterized by the finiteness of the time domain response of the channel.

In an embodiment of the invention the determining of the weighting operation via a weighting matrix is characterized as being as solving a least squares problem in the time domain in a non-iterative way, meaning that an explicit solution is presented.

In another embodiment of the invention the determining of the maximum likelihood estimate is characterized as a one step operation, which can be understood as solving a constrained least squares problem in the frequency domain, in a non-iterative way. In a further embodiment thereof, the method is characterized as a projection.

In an alternative embodiment of the invention it is recognized that said method can be implemented as a two-step matrix multiplication process instead of a three-step approach. Indeed by splitting the weighting matrix in two submatrices, together defining said weighting matrix by multiplication, said submatrices preferably being equal, and by modifying the IFFT and FFT partial matrices, by left-hand and right-hand matrix multiplication with such a submatrix, the method can be executed as a two-step process wherein first an intermediate result is determined by multiplying a partial weighted $N_H$ by $N_U$ IFFT matrix with said reference tones with $N_H$ the length of said finite time response and thereafter multiplying said intermediate result with a partial weighted $N_F$ by $N_H$ FFT matrix, to thereby obtain said maximum likelihood frequency domain estimates, is done.

In a second aspect of the invention telecommunication circuits, including a channel estimation circuit, having the necessary subcircuits for executing one of the above described methods, are presented.

In an embodiment of said second aspect a general purpose programmable circuit, programmed for executing said channel estimation methods, is disclosed.

In another embodiment the channel estimation circuit, implements a three-step approach, each step having its dedicated circuitry. In a further embodiment thereof part of said dedicated circuitry comprises IFFT and FFT circuits.

In another embodiment the channel estimation circuit, implements a two-step approach, each step having its dedicated circuitry.

In another embodiment the channel estimation circuit, implements a one-step approach, each step having its dedicated circuitry.

One aspect of the invention to proposes a channel estimation method, being used in both a single and multi-user context, which is capable of working with non-equidistant reference tones, and thus compatible with modem telecommunication standards. Further said channel estimation method should have low complexity without losing optimality of the channel estimate.

BRIEF DESCRIPTION OF THE DRAWINGS

FIG. 1 relates to a modem telecommunication system exploiting a kind of subband processing (OFDM) wherein the invention can be used for performing equalization of the received signal.

FIG. 2 shows situation wherein the invented channel estimation outperforms classical approaches because it still provides an optimal estimate although no sufficient references tones (full line) are available to cover all carriers (dashed line) of the channel to be estimated.

DETAILED DESCRIPTION OF THE INVENTION

Figure 3:
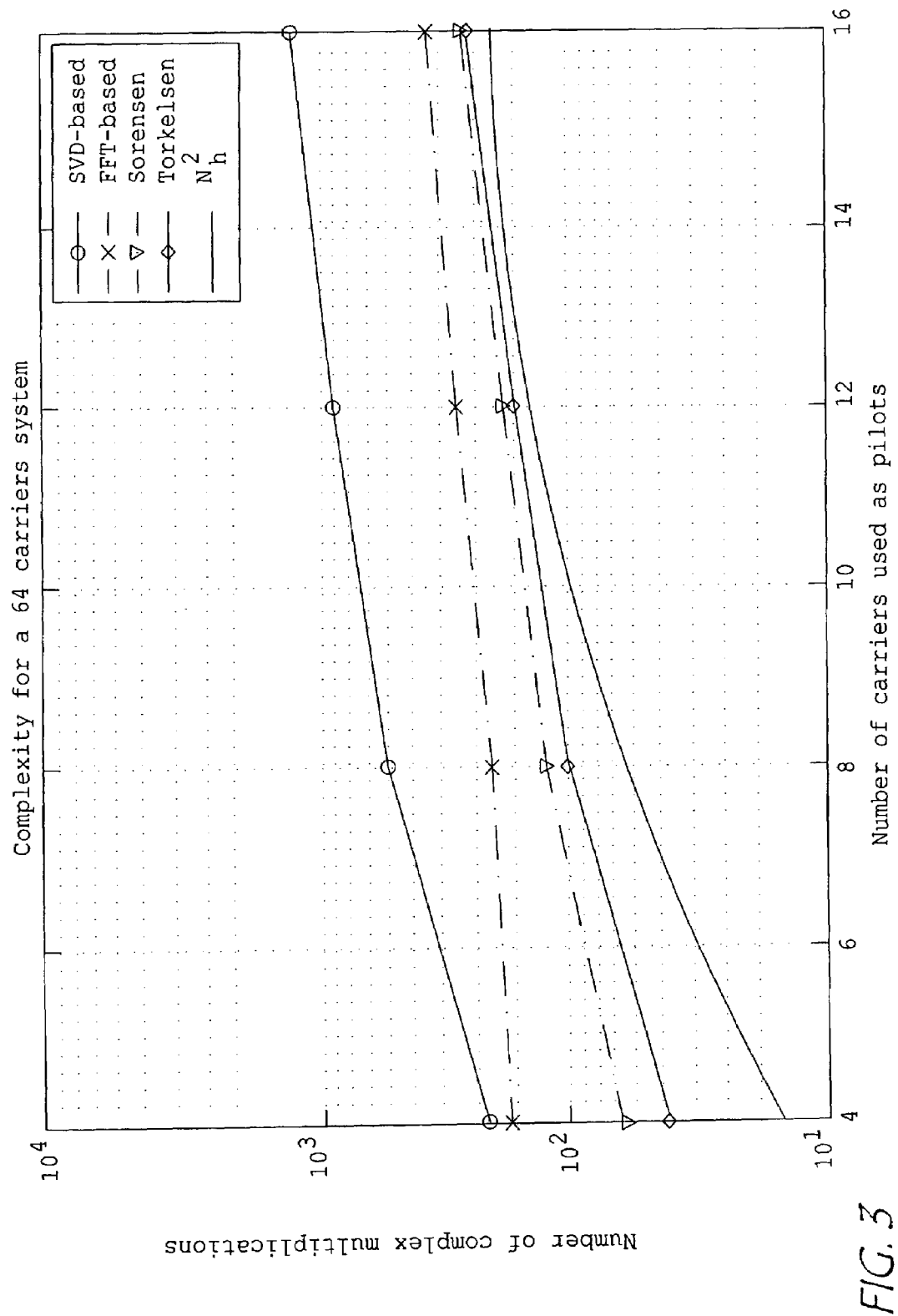
FIGS. 3–4 and 6–7 show comparison between the invention and other methods and between various embodiments of the invention. Comparisons of the FFT based and optimal methods of the invention with the SVD approximation methods (LMMSE) with respect to complexity and Bit-Error-Rate are shown.

The invention explicitly uses the finite delay spread of the channel and develops a low complexity algorithm capable of estimating the channel from part of the carriers only. A deterministic model is introduced and therefrom the associated Maximum Likelihood estimator is derived. This ML estimator can be interpreted as a transformation from frequency domain to time domain and back to frequency. The actual estimation is done in the time domain, where the number of parameters (i.e. the channel length) is small. The estimator is obtained by minimizing a quadratic criterion, which, combined with the small number of parameters, leads to a low complexity algorithm. As such, an exact low complexity solution is obtained. The invention is applicable when reference tones are available for all $N_c$ carriers of the multi-carrier channel but also when less reference tones are transmitted as in Pilot Symbol Assisted Modulation (PSAM). In an alternative formulation the invention can be casted as a Constrained Least Squares (CLS) solution. In such framework also explicitly the length of the channel impulse response is used and an ad-hoc constrained least squares estimator is derived. The invented method allows non regular spacing of the carriers.

The invention is further described for OFDM but it is clear that any subband processing method can be dealt with. After introducing the OFDM system model, the statistical model and channel estimator is presented, along with the extension to PSAM and the link with the CLS estimator. The time-frequency interpretation of the ML estimator is given, and the benefits provided by a combined PSAM/decision-feedback system are indicated. The complexity of the algorithm is presented and simulation results for indoor PSAM and spectral-shaping systems are discussed.

Normal letters represent scalar quantities, boldface represent vectors and boldface capitals matrices. Slanted (resp. roman) letters indicate time (resp. frequency) domain quantities. $X^T$, $X^H$ and $X^\#$ respectively mean transpose, conjugate transpose and Moore-Penrose pseudo-inverse of X. If X is full column rank, then $P_X = X(X^H X)^{-1} X^H$ is the orthogonal projection onto the space spanned by the columns of X. Further the invention refers to IFFT matrices (related to IDFT transformations) and FFT matrices (related to DFT transformation), which are defined as follows:

$$W_N^{k,l} = e^{-j\,2\pi kl/N_C}$$

$$j = \sqrt{-1}$$

$$IDFT = \begin{bmatrix} W_N^{0,0} & \cdots & W_N^{0,N-1} \\ \vdots & \ddots & \vdots \\ W_N^{N-1,0} & \cdots & W_N^{N-1,N-1} \end{bmatrix}$$

$$DFT = \begin{bmatrix} W_N^{0,0} & \cdots & W_N^{0,1-N} \\ \vdots & \ddots & \vdots \\ W_N^{1-N,0} & \cdots & W_N^{1-N,1-N} \end{bmatrix}$$

OFDM modulation consists in multiplexing QAM data symbols over a large number of orthogonal carriers. To this end, the QAM symbols of an OFDM symbol are passed through an Inverse Fast Fourier Transform (IFFT/IDFT). In the presence of a time dispersive channel, a Cyclic Prefix (CP) is prepended to each OFDM symbol to preserve orthogonality between carriers and eliminate InterSymbol Interference (ISI). A single user/single channel communication setup (see FIG. 1), with OFDM modulation, is considered now, but it is clear that the estimation method can easily be extended to a multi-user, multi-channel context as known in spatial division multiple access systems. Recall that the goal is to obtain $h[0], \ldots, h[N_C-1]$, in order to perform channel equalization. The set-up is described by:

$$Y = X \odot H + N \quad (1)$$

where the Hadamard (i.e. element-wise) product of the columns of X with H is used. For a single OFDM symbol this results in:

$$y = x \odot H + n \quad (2)$$

The QAM source is written as $X = [x_0 \ldots x_{M-1}]$, where $x_m = [x_{0,m} \ldots x_{N_C-1,m}]^T$ is an OFDM symbol. $N_c$ denotes the number of carriers, m is a time index (often omitted for clarity) and M is the number of OFDM symbols. After IFFT and cyclic prefix insertion, the transmitted signal is $X_m = [X_{N_C-N_P,m} \ldots X_{N_C-1,m} X_{0,m} \ldots X_{N_C-1,m}]^T$ where $N_P$ is the size of the prefix and $X = [X_0 \ldots X_{M-1}]$. For a channel $h = [h_0 \ldots h_{N_H-1}]$, where $N_H$ being smaller than or equal to $N_p$, the received vector is, after prefix removal and FFT, $y_m = x_m$ H, where $H = [H_0 \ldots H_{N_C-1}]^T$ is the FFT of the channel. Equations (1) and (2) further take the additive (possibly colored) Gaussian noise into account. Equalization is then done by a complex division on each carrier.

Two types of training (PSAM and spectral shaping systems) are considered. With training here is meant determining or estimating of the channel frequency response. In classical training based estimation, all components of x are known. Spectral based systems use a minor modification of the classical training, zeroing a small number of carriers (named zero carriers) at the edges and in the middle of the band used. PSAM on the other hand bases it's channel estimation on a small fraction of the carriers, usually evenly spaced on the whole band, and possibly on varying positions from one OFDM symbol to the next. The invention is applicable in all said types of training.

The ML estimator is derived, based on a reduced order model. It is extended to PSAM, linked to the CLS method and interpreted in terms of time-frequency transformations. It is also applied on a combination of PSAM and decision-feedback estimation.

First the case is explained wherein a channel with $N_C$ subchannels is determined by using an amount $N_U$ of reference tones, also denoted pilot tones being equal to $N_C$. The channel response is determined at the frequencies defined by its carriers or subchannels.

Equation (2) shows that the OFDM system can be described as a set of parallel Gaussian channels. Since the time domain channel h has a finite length (in a well-designed OFDM system smaller than the prefix length) these parallel channels feature correlated attenuations. Considering, w.l.o.g., $x=[1\ 1\ \ldots\ 1]^T$, equation (2) becomes $$y = F \begin{bmatrix} h \\ 0 \end{bmatrix} + n = H + n, \tag{3}$$

where F is a $N_c \times N_c$ FFT matrix. y is a Gaussian random variable with mean $F[h\ 0]^T$ and covariance $C_{nn}$. The signal y can also be denoted the captured reference tone at the receiving peer. The signal part of y is contained only in the space spanned by its mean. Separating the signal subspace from the noise only subspace, the received signal can be rewritten as:

$$y = [F_h F_n] \begin{bmatrix} h \\ 0 \end{bmatrix} + n. \tag{4}$$

Relying on this, the reduced space signal is defined as $$r = F_h^\# y = h + F_h^\# n = h + v, \tag{5}$$

where v is a zero mean Gaussian noise of covariance $C_{vv} = F_h^H C_{nn} F_h$. If $C_{nn} = \sigma_n^2 I_{Nc}$, v is a white Gaussian noise of covariance matrix $\sigma_n^2 I_{Nh}$. The reduced space signal has a log likelihood function expressed by $$\log f(r) = -\log(\pi \det(C_{vv})) - (F_h^\# y - h)^H C_{vv}^{-1} (F_h^\# y - h). \tag{6}$$

Maximizing this log likelihood with respect to h leads to the ML estimator given by $$\hat{H} = F_h F_h^\# y = P_{F_h} y, \tag{7}$$

where $P_{F_h}$ denotes the orthogonal projection on the column-space of $F_h$. Before performing the ML estimation, $N_H$, the amount of non-zero time samples of the impulse response of the channel, must be determined, and we denote it's estimation as $N_{HE}$.

Formula (7) shows how the maximum likelihood frequency domain estimate of said channel response is obtained from said $N_H = N_C$ captured reference tones y at said $N_F = N_C$ predetermined frequencies. The same formula (7) shows that an orthogonal projection of said reference tones on the column space of a partial $N_C$ by $N_H$ FFT matrix is involved.

Now the cases wherein less reference tones are used than subchannels in the channel is explained. In the case of Pilot Symbol Assisted Modulation and spectral shaping systems, not all symbols in x are known, and only a subset of $N_u$ measured carriers or captured reference tones can be used. Only this part of the signal (denoted $y_u$) will be used. These are the reference tones. Equation (5) becomes $$r = F_{uh}^\# y_u = h + F_{uh}^\# \pi = h + v, \tag{8}$$

where F has been decomposed as:

$$F = \begin{bmatrix} F_{uh} \\ F_{lh} \end{bmatrix} \tag{9}$$

and where measured pilots have been grouped together. Ungrouped pilots can be handled by straightforward permutations in columns and lines of the vectors and matrices. The ML estimator for spectral shaping systems, corresponding to (8) is $H_u = P_{F_{uh}} Y_u$ (only the measured carriers are estimated, as they are the only ones carrying data, thus $N_U = N_F$) and, for PSAM, it is $H = FF_{uh} y_u$ (the whole channel is estimated). Note that in the spectral shaping systems case, again a projection of said captured reference tones on the column space of a partial $N_F$ by $N_H$ FFT matrix is involved.

The invention can be casted as a Constrained Least Squares estimator by expressing the reduced channel length in the following equation:

$$\begin{bmatrix} h \\ - \\ 0 \end{bmatrix} = \begin{bmatrix} C_u \mid C_l \end{bmatrix} \cdot \begin{bmatrix} y_u \\ - \\ y_l \end{bmatrix} \tag{10}$$

where Cu and Cl are parts of an inverse FFT matrix. From this equation, we can write a constraint equation as $$C_u y_u + C_l y_l = 0 \tag{11}$$

leading to the Constrained Least Squares solution:

$$\hat{H}_u = C_u^H (C_u C_u^H)^\# C_l C_l^H (C_l C_l^H)^\# C_u y_u \triangleq P_S y_u \tag{12}$$

where $P_S$ is an orthogonal projection matrix (hermitian and $P_S^2 = P_S$) which can be further simplified to $P_S = C_u^\# P_{Cl} C_u$. However, finding an explicit expression for S is not straightforward. When $N_c - N_u > N_{he}$ (otherwise $P_S$ is not full rank and the CLS solution is not defined) and taking into account that $C_u F_{uh} + C_l F_{lh} = 0$, the following equations show that $P_S = P_{F_{uh}}$. Indeed, the combined projection on S and $F_{uh}$ is shown to be a projection on $F_{uh}$:

$$\begin{aligned} P_S \cdot P_{F_{ish}} &= -C_u^\# P_{C_l} C_l F_{lh} (F_{uh}^H F_{lh})^{-1} F_{tsh}^H \tag{13} \\ &= C_u^\# P_{C_l} C_l F_{lh} F_{lh}^\# C_l^\# C_u \\ &= C_u^\# C_u F_{tsh} F_{uh}^\# C_u^\# C_u \\ &= P_{F_{uh}} \end{aligned}$$

Hence, the two spaces are the same and the estimators are also the same. As $H = F(F_{uh}^H F_{uh})^{-1} F_{uh} y_u$, the channel estimator is the cascade of a partial IFFT, a weighting matrix and a partial FFT. For an arbitrary number of pilots ($>N_{he}$), the global estimation scheme (i) to perform a partial initial IFFT, partial as only part of the carriers are measured, (ii) weighting the non-trivial part of the channel impulse response width by $(F_{uh}^H F_{uh})^{-1}$ and (iii) transforming back to the frequency domain. It is an important aspect of the invention to recognize that in the general case of non-equidistant carriers and/or when not all pilots or reference tones are present a weighting matrix, being essentially different from the identity matrix is needed in order to preserve optimality.

Figure 11:
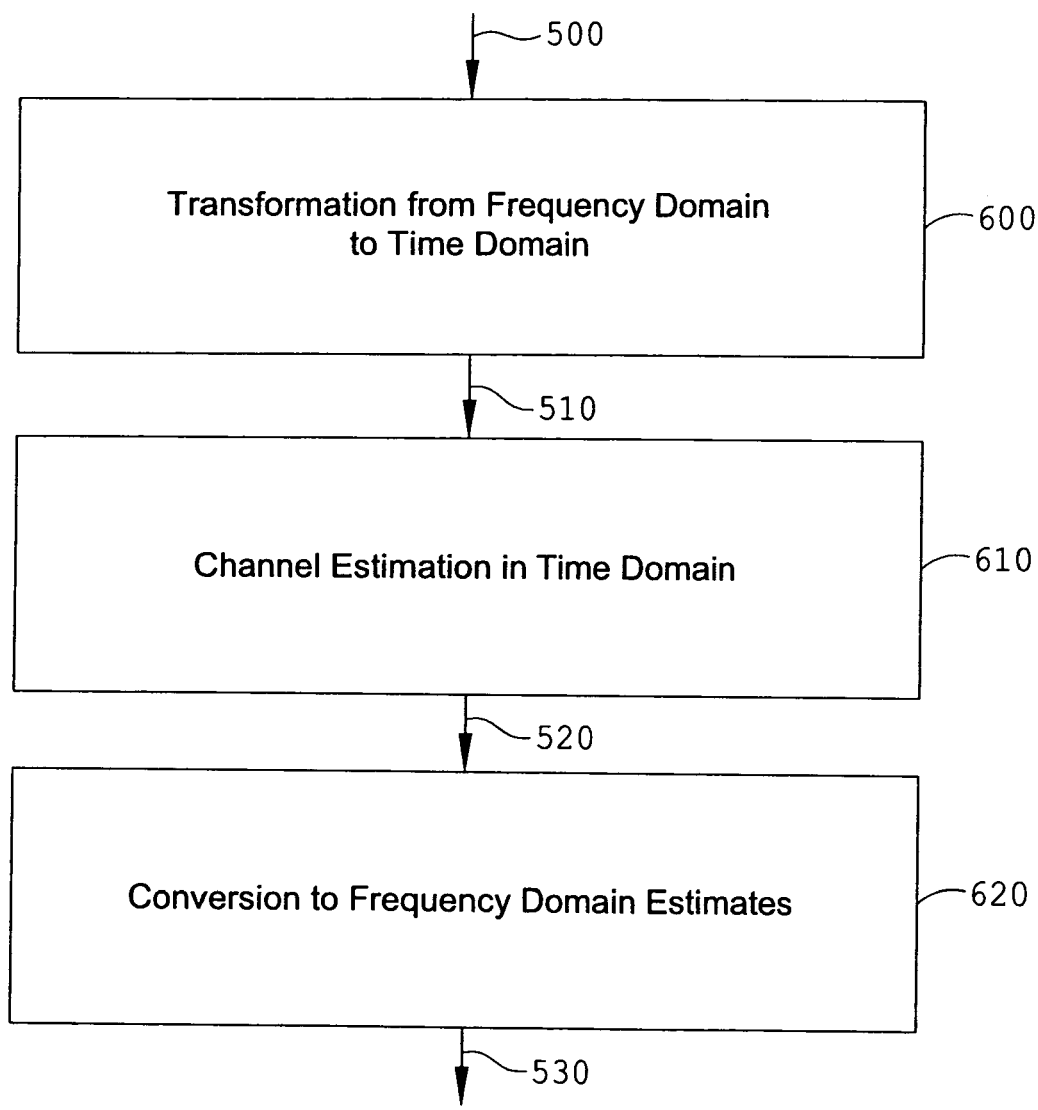
FIG. 11 shows a flowchart of the three step approach wherein reference tones (500), being frequency domain measurements, are used as input and a channel estimate (530) is obtained. The first step is a transformation from frequency domain to time domain (600), obtaining time domain measurements (510), the second step is an estimation step in the time domain (610), resulting in time domain estimates (620), thereafter being converted in a last step (620) into frequency domain estimates (530).

FIG. 11 shows a flowchart of a three step approach. In an embodiment of the invention the step (600) performs Fuh, the step (610) performs $(F_{uh}^H F_{uh})^{-1}$ while step (620) performs F. Said embodiment can be implemented by performing explicit matrix multiplications or for the steps (600), (610) using IFFT and FFT circuitry.

Figure 13:
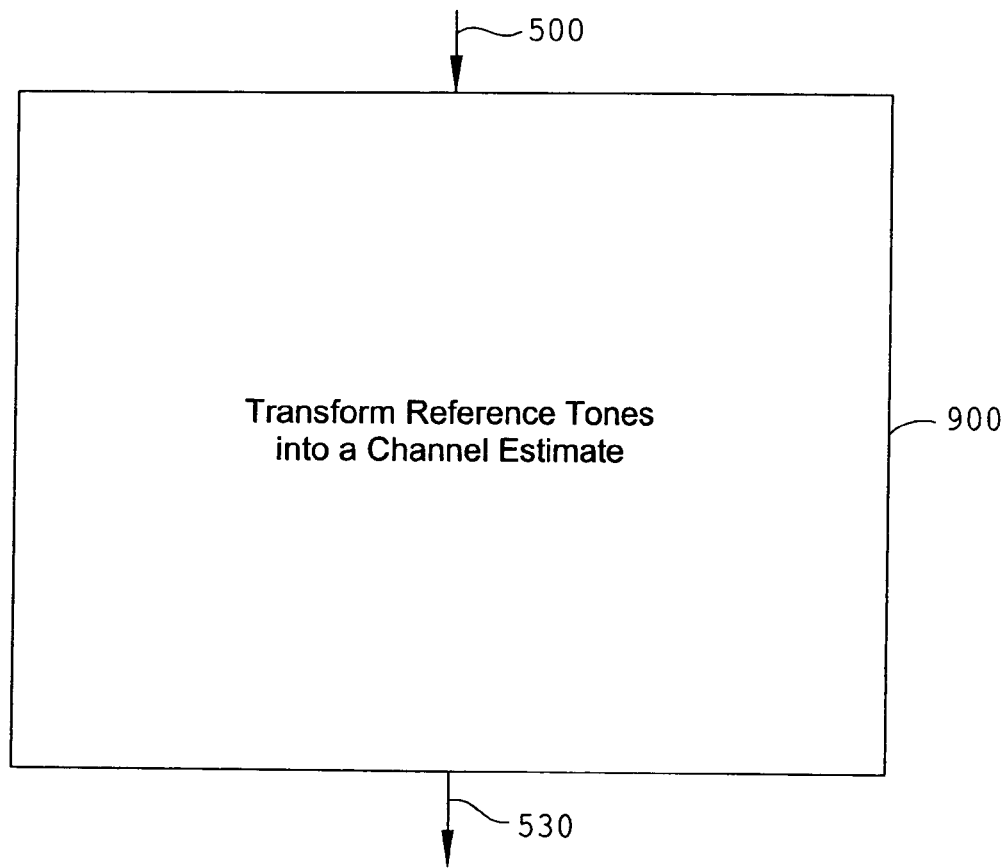
FIG. 13 shows a flowchart of a one step approach wherein reference tones (500) are transformed into a channel estimate (530) in a single step (900).
Figure 14:
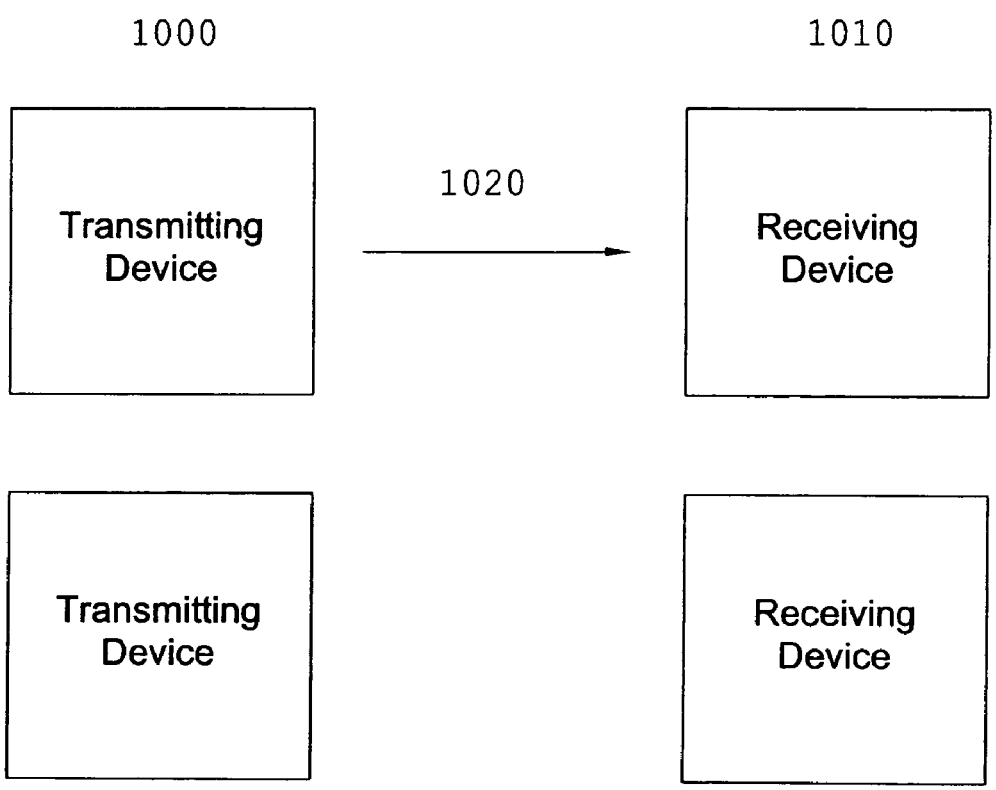
FIG. 14 shows a transmitting peer (1000) with at least one transmitting device (two shown) and a receiving peer (1010) with at least one receiving device or receiver (two shown). The channel estimation within said receiver tries to characterize the channel (1020) in between the transmitting device and the receiving device.

FIG. 13 shows a flowchart of a one step approach wherein reference tones (500) are transformed into a channel estimate (530) in a single step (900). In one embodiment said single step approach can execute either Ps from equation (12). In an alternative embodiment the operation defined in equation (14) is performed or a mathematical equivalent, as defined via equation (13).

Indeed, it is only if all pilots are present, or if they are regularly spaced, that the method boils down to going from the frequency domain to the time domain, force the time channel estimator to be of length $N_{he}$ and going back to the frequency domain as shown in [G. G. Raleigh and V. K. Jones. "Multivariate Modulation and Coding for Wireless Communication," IEEE Journ. on Special Areas in Communications, 17(5):851–860, May 1999.[, wherein no weighting is used.

Figure 7:
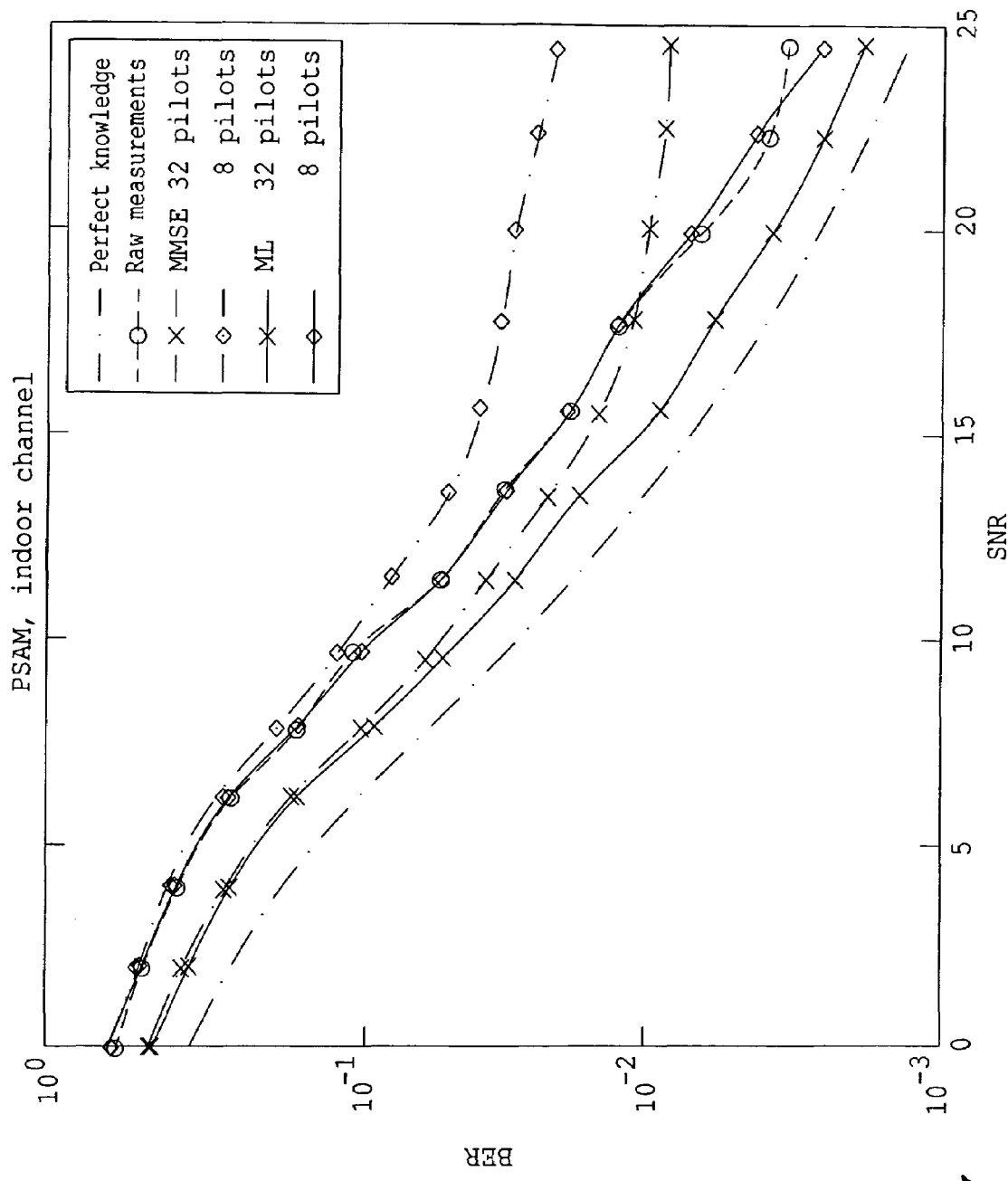

The classical ML solution can be applied to a combination of PSAM and decision-feedback. Indeed, suppose we use the pilot symbols along with decisions taken on the other carriers, then r=h+v remains valid, with a given $C_{vv}$, which leads to $H=P_{F_{he}}y$. Hence, if the designer can afford the increment in complexity, combination of PSAM and decision-feedback is desirable. Indeed, FIG. 7 shows that a difference in performance of 2–3 dB can be expected between an all-pilot system (which is equivalent to combined PSAM/DF if decision errors are neglected) and a PSAM system with 8 pilot carriers.

The complexity of the ML estimator is significantly lower than SVD approaches, both for spectral shaping and PSAM systems. This low complexity relies on the time-frequency interpretation and pruning of the (I)FFTs. By construction, $P_{Fuh}$ is a low rank matrix (of rank $N_{hee}$). Taking its hermiticity into account, it can be written as $$P_{F_{uh}}=VV^H \qquad (14)$$

where V is a matrix of size $N_c \times N_{he}$ that can be precomputed. Hence, the complexity for computing the estimator is 2 $N_u \times N_{he}$ complex multiplications for the global ML estimator.

Figure 12:
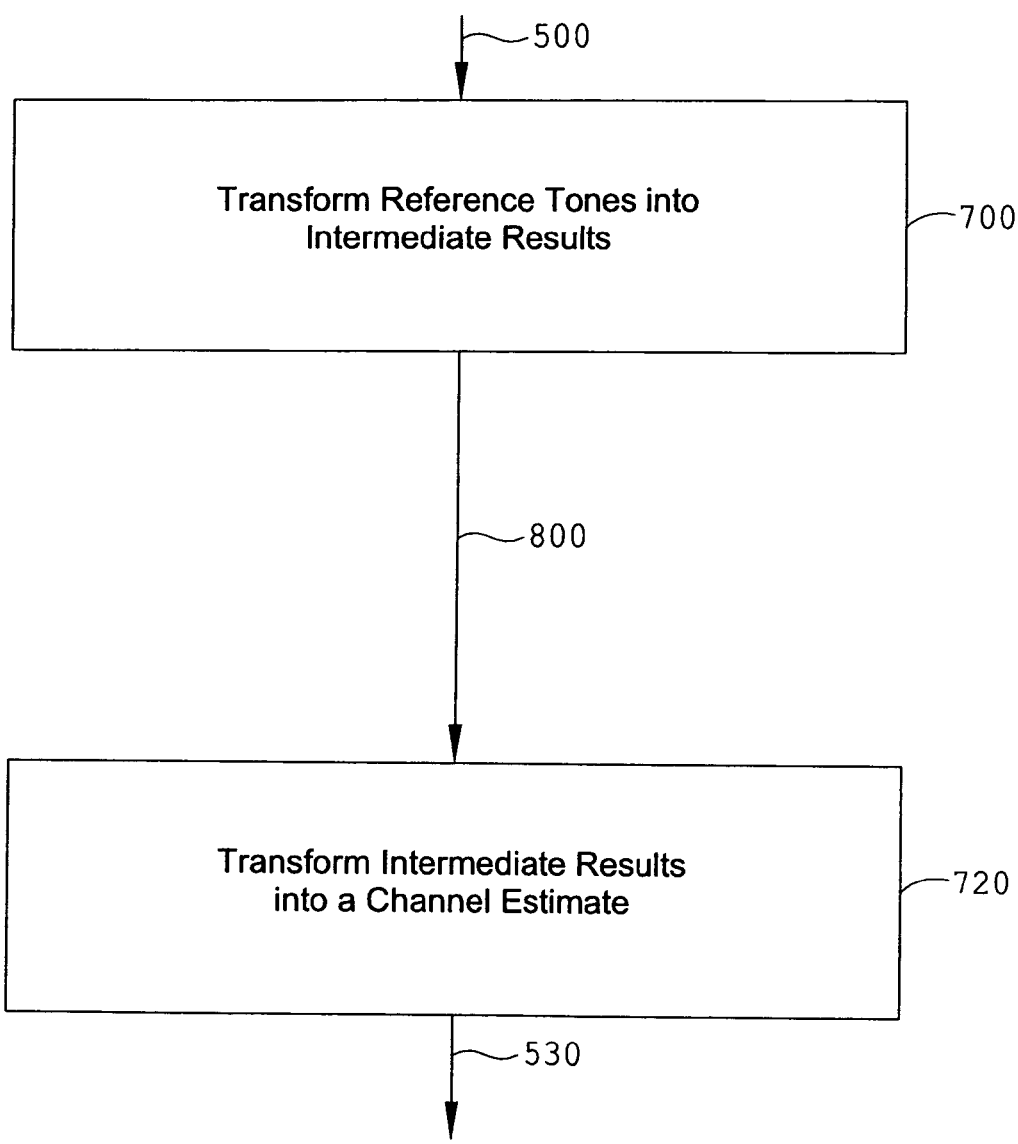
FIG. 12 shows a flowchart of the two step approach wherein reference tones (500), being frequency domain measurements, are used as input and a channel estimate (530) is obtained. The first step (700) transforms said reference tones into an intermediate results (800). The second step (720) further transforms said intermediate results into a channel estimate.

FIG. 12 shows a flowchart of the two step. In an embodiment said first step (700) executes the operation defined by the Hermitian inverse of V while the second step (720) performs the operation defined by V itself.

Figure 4:
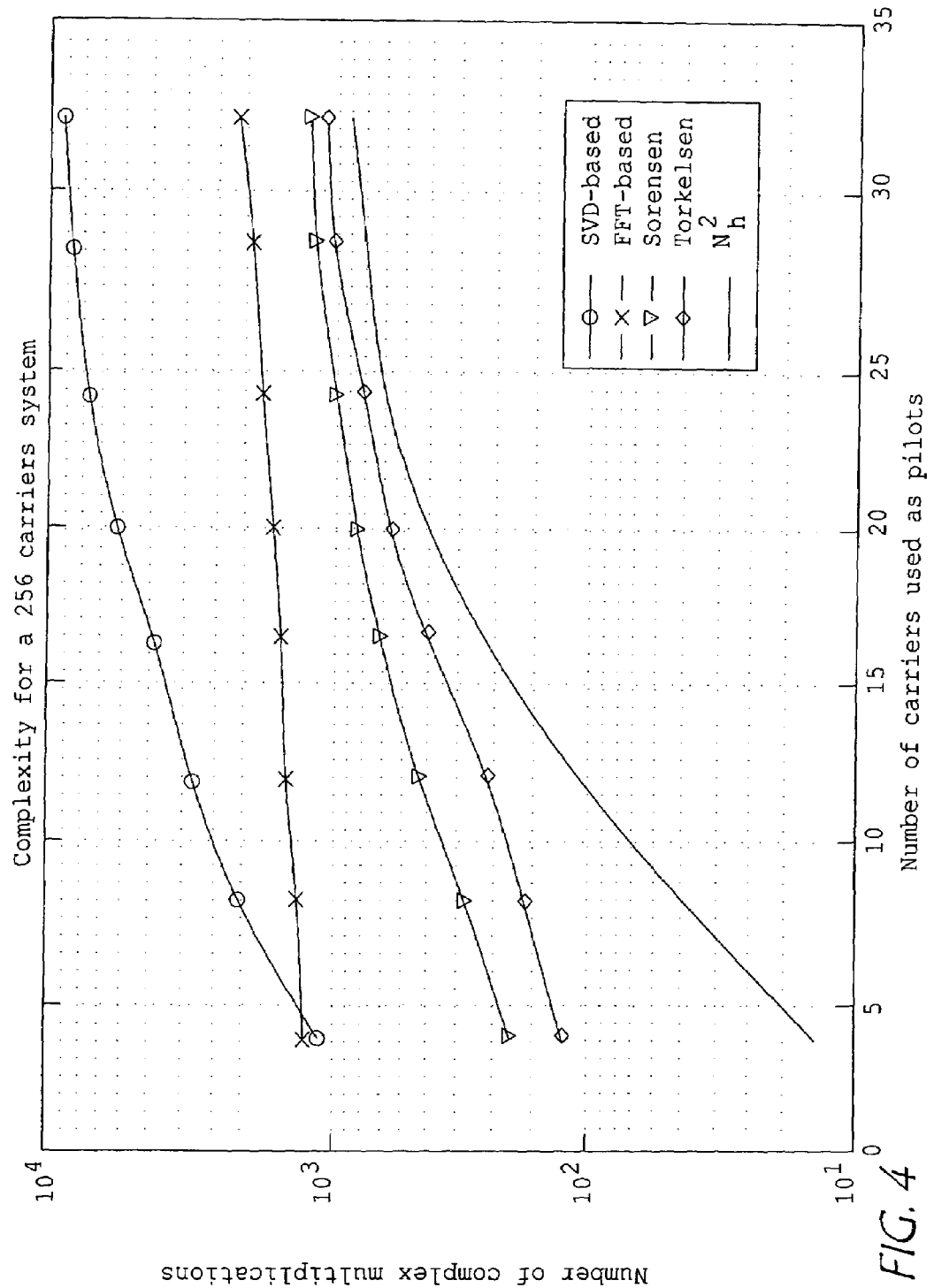

This complexity is about the same as for the SVD approach, however, while [O. Edfors, M. Sandell, J. J. van de Beek, S. K. Wilson, and P. O. Borjesson. "OFDM Channel Estimation by Singular Value Decomposition," IEEE Trans. on Communications}, 46(7):931–939, July 1998.] uses an approximation, (14) is an exact maximum likelihood estimate. Further complexity reduction can be obtained by using the time-frequency interpretation. Indeed, the projection operation can be expressed by the cascade of two partial FFTs, weighted by a $N_{he} \times N_{he}$ non-identity matrix. With a radix-4 implementation of the FFT, the complete estimator would require 1.5 $N_c$ ($\log_4(N_c)-1$)+$N_{he}^2$ complex multiplications. Furthermore, some additional complexity gain can be achieved by using FFT pruning or transform decomposition. Such techniques lead to a significant gain for the Fourier Transforms. However, the last term ($N_{he}^2$), due to the weighting matrix (($F_{uh}^H F_{uh}$)$^{-1}$), remains unchanged (FIGS. 3,4).

When using Pilot Symbol Assisted Modulation, a comb spectrum (FIG. 2) has to be measured, and only the teeth of this comb are used for the FFTs. This particular case has been studied by [S. He and M. Torkelson, Computing Partial DFT for Comb Spectrum Evaluation, IEEE, 1996, Vol. 3, no. 6, June, p 173–175]. In this case, the DFT can be computed with $N_c/4+N_{he}/2+\log_2 N_{he}-N_{he}$ complex multiplications, which represents a large gain for a large number of carriers. FIGS. 3 and 4 show complexity evaluations of the different approaches: the SVD-based approach of [O. Edfors, M. Sandell, J. J. van de Beek, S. K. Wilson, and P. O. Borjesson. "OFDM Channel Estimation by Singular Value Decomposition," IEEE Trans. on Communications, 46(7):931–939, July 1998.] and the frequency-time approaches according to the invention with plain FFTs, with FFT pruning and with FFT optimized for a comb spectrum.

The complexity for FFT-based solutions is much lower than for the SVD-based approach, both for spectral shaping and PSAM systems. Furthermore, simulations show that the ML algorithm can work with a significantly smaller $N_{he}$ than the LMMSE, which results in a still larger gain than appears in FIG. 3. For a relatively large number of pilot carriers, the main contribution to the complexity is due to the weighting matrix (see the $N_{he}^2$ curves in FIGS. 3 and 4). However, for pure PSAM with regularly spaced pilot carriers, it can easily be shown that the weighting matrix (($F_{uh}^H F_{uh}$)$^{-1}$) is proportional to the identity matrix, and complexity is even lower. This special case of our algorithm is the frequency correlation part of the algorithm developed by Raleigh and Jones [G. G. Raleigh and V. K. Jones. "Multivariate Modulation and Coding for Wireless Communication," em IEEE Journ. on Special Areas in Communications}, 17(5):851–860, May 1999.], which require regularly spaced pilot carriers or reference tones, while the invention is not limited thereto. At the contrary the invention is specially constructed for modem telecommunication standards with non-regularly spaced carriers.

Figure 5:
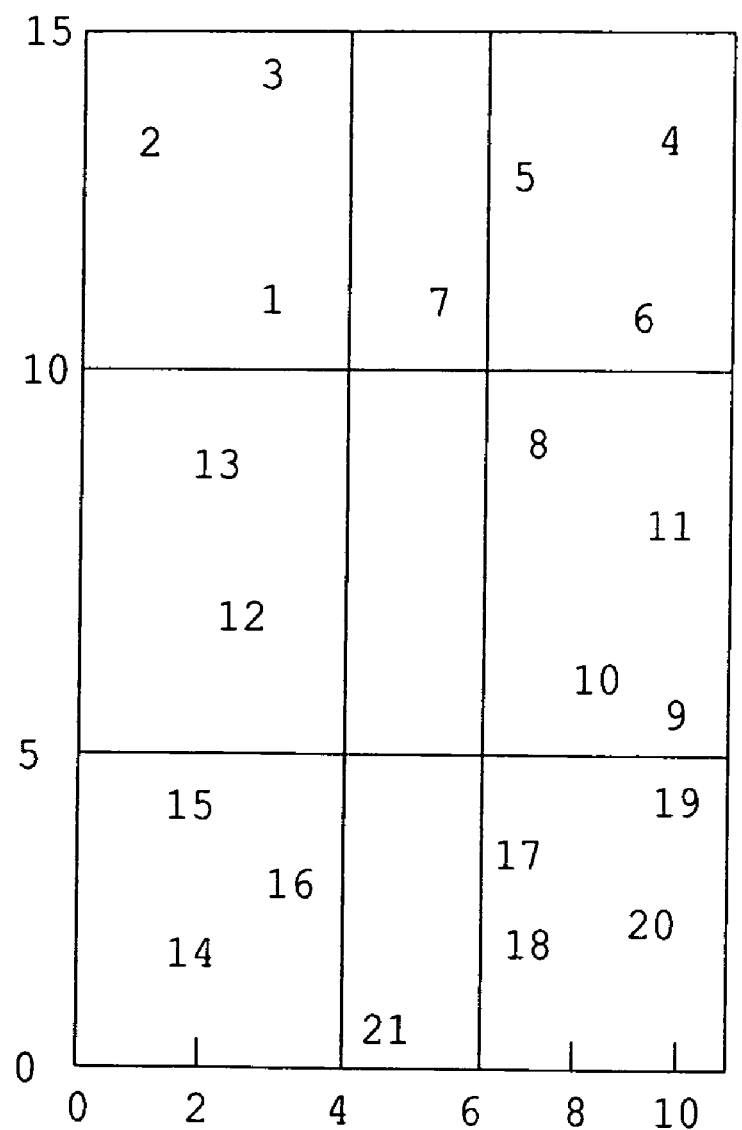
FIG. 5 shows a typical topology as found in indoor wireless communication wherein the transmitting scheme with the invented estimation method can be exploited.
Figure 6:
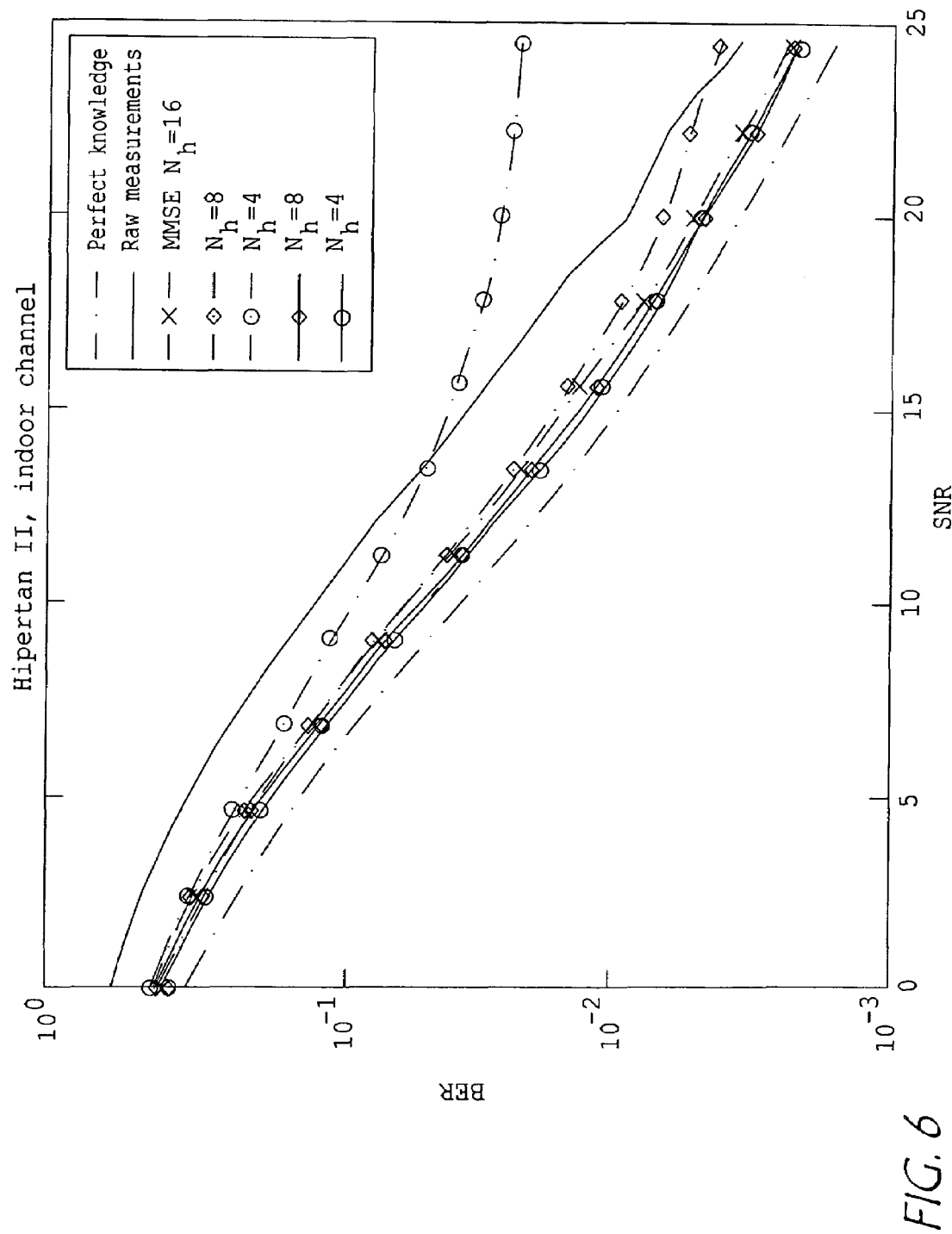

To evaluate the performances of the ML estimator, and compare it with the LMMSE algorithm, we simulate a spectral shaping system and a PSAM-based system in an indoor radio channel. Two OFDM schemes with 64 and 256 carriers are considered, both with QPSK modulated carriers and a cyclic prefix of 16. The 64-carriers scheme is simulated with the Hiperlan II zero carriers and the 256-carriers with PSAM. The data rate is 25 M samples/second over the air (i.e. including the cyclic prefix) with a carrier frequency of 5.6 GHz. We consider a collection of 120 indoor office-like channels. The channel is modeled by means of a ray-tracing technique, considering 20 emitter locations and 6 receiver locations, as sketched in FIG. 5. From the ray-tracing results, it appears that the channel length is of the order of 4 to 6 and can be modeled as having an exponentially decaying power delay profile with normalized time constant 2 (for simulation of [Edfors et al.]). For the spectral shaping system, the Bit Error Rate (BER) is simulated for both LMMSE [O. Edfors, M. Sandell, J. J. van de Beek, S. K. Wilson, and P. O. Borjesson. "OFDM Channel Estimation by Singular Value Decomposition," IEEE Trans. on Communications}, 46(7):931–939, July 1998.] and ML estimators and for $N_{he}$ ranging from 4 to 16. BER based on exact channel knowledge and raw measurements are evaluated for comparisons. Simulation results (FIG. 6) clearly show that the LMMSE suffers from a threshold effect at high SNR. To obtain similar performances for both algorithms, $N_{he}$ must be 2 to 4 times larger for LMMSE than for ML. The behavior of the ML (and to some extent of the LMMSE) estimator at low SNR gives some insight on the influence of $N_{he}$. Going from higher to lower $N_{he}$ leads to better performance (FIG. 6); indeed, the values of the channel impulse response beyond the lower $N_{he}$ are below the noise level, so that their estimation introduces more noise than relevant information about the channel. For the PSAM-based system, we have evaluated both estimators with 8 and 32 tones and $N_{he}$–8 (FIG. 7). In this simulation, "raw measurements" mean measurements on all pilots. As for the spectral shaping system, the flooring effect of the LMMSE estimator is essentially limiting it's effectiveness at high SNR's. Noteworthy, the ML estimator based on 8 over 256 tones gives similar performance as raw measurements on all carriers.

A low complexity Maximum Likelihood(ML) OFDM channel estimator is proposed. It relies on a deterministic model (i.e. no statistical information on the channel) that takes the finite delay spread of the channel into account, which is linked to the frequency correlation of the channel. Our ML estimator can be interpreted as a translation of some initial estimate of the frequency response of the channel to the time domain, followed by a linear transformation of this channel impulse response, and retranslation to the frequency domain. This interpretation leads to low complexity algorithms, derived by combining the partial (I)FFTs involved and a small weighting matrix. Comb spectrum due to Pulse Symbol Assisted Modulation allows further pruning of the FFT's. Based on theoretical grounds that shade a new light on former solutions, the proposed algorithms have a significantly lower complexity than the low-rank approximation of the LMMSE estimator, while being optimal.

Figure 8:
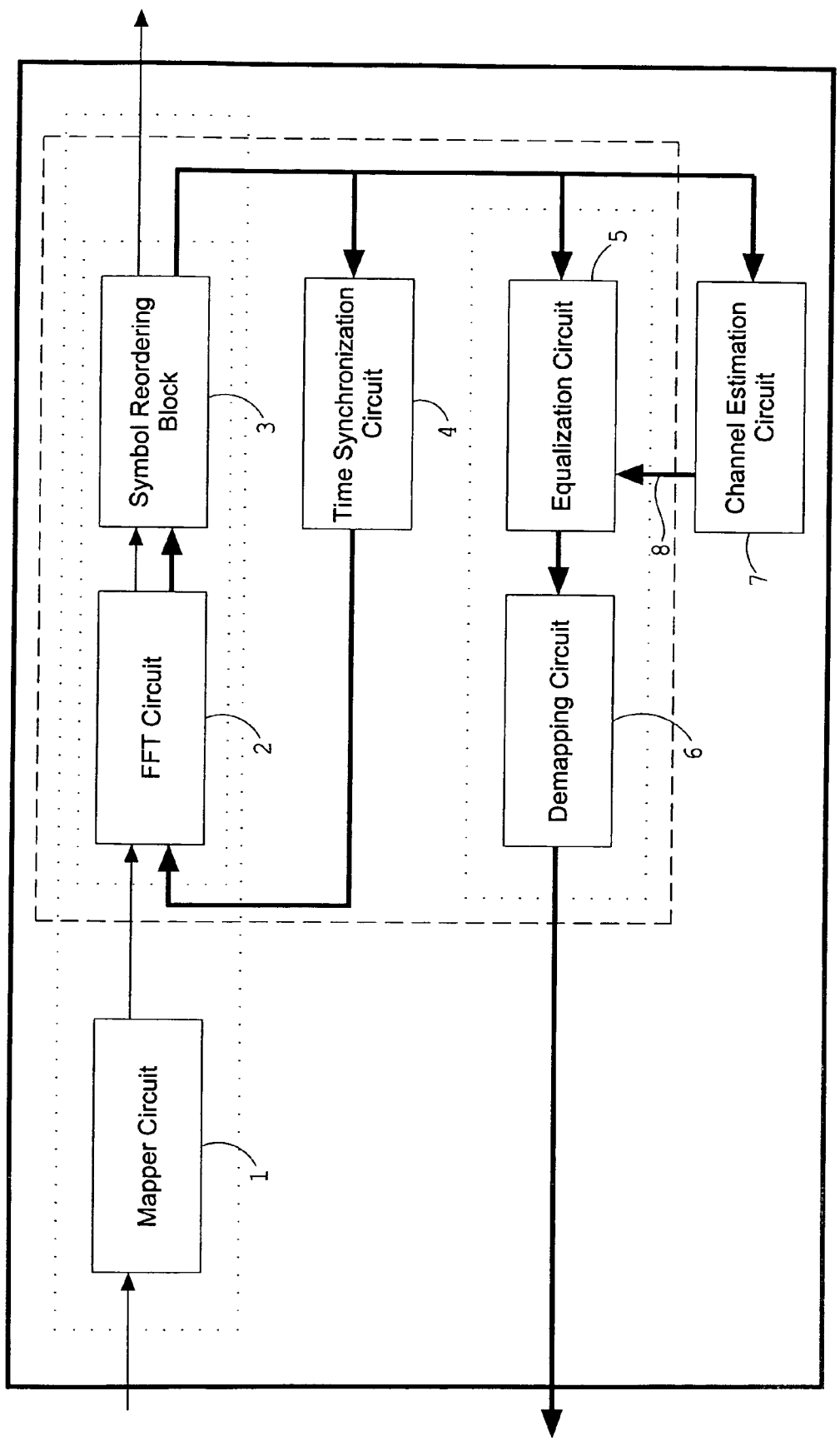
FIG. 8 shows an architecture of a signal transmitting and/or receiving circuit, wherein said channel estimation method fits.

The concept of channel estimation proposed here fits within telecommunication devices as described in U.S. Ser. No. 09/505,228, now U.S. Pat. No. 6,760,300. FIG. 8 shows an architecture of a signal receiving circuit, wherein said channel estimation method fits, a fast Fourier transform circuit (2), a symbol reordering block (3), a time synchronization circuit (4), performing carrier and clock frequency offset estimation, an equalization circuit (5), a demapping circuit (6) and a channel estimation circuit (7), executing the described channel estimation method. Said channel estimation circuit provides channel information (8) for said equalization circuit (5). Said circuit can easily be used also for signal transmitting when a mapper circuit (1) is added.

In an embodiment said time synchronization circuit (4) determines control information on that part of its input, being a non-orthogonal frequency division multiplexing signal, for instance partly comprising of a Pseudo-Noise sequence. Said control information can be signal level information, carrier offset or timing information. The signal conversions in the time synchronization circuit (4) comprise at least of carrier offset compensation and guard interval removal.

In an embodiment said mapper circuit (4) is a serial to parallel converting circuit.

In an embodiment said symbol reordering circuit (3) performs guard interval introduction and symbol reordering for the modulating dataflow and symbol reordering, a first step for despreading and zero carrier grouping for the demodulating dataflow.

In an embodiment said equalization circuit (5) performs corrections for channel distortions, thereby using the estimated channel information (8), on signals, said corrections are preferably complex multiplications or divisions.

In an embodiment said demapping circuit (6) extracts bits from the carriers of the frequency domain representation of the equalized signals.

The inputs to said receiver typically go though the time synchronization circuit (4), then though the fast Fourier transform circuit (2) and thereafter through the symbol reordering circuit (3). The symbol reordered signal is then fed into the equalization circuit (5), whereafter the demapping circuit (6) is used for extracting the final output. The mapper circuit (1) when available is connected to the fast Fourier transform circuit (2).

It is important to note that channel estimation must not be confused with carrier and clock offset estimation. More in particular, in the telecom device shown, said determining at and in the receiving peer happens on said reference tones, being corrected for carrier and clock frequency offsets. Hence said channel estimation happens after carrier and clock frequency offset correction. Note that FIG. 1 shows a representation of an OFDM system, wherein the telecom devices, shown in FIG. 8, fit. Indeed said devices can be used both at the transmitting side 25 (left side of FIG. 1) and the receiving side 35 (right side of FIG. 1). The information (8) provided by the channel estimation circuit (7) are the channel value h[0], . . . h[N−1], with N here the amount of carriers in the channel. The equalization boils down to the complex divisions, as shown in FIG. 1. The concept of channel estimation proposed here uses frequency pilots to estimate the frequency response times and is based on a particular non-iterative linear estimation of the channel responses, further enabling frequency domain channel equalization. The derived least mean square approach explicitly exploits the finiteness of the channel impulse response.

In an aspect of the invention essentially digital circuits or devices for determining a maximum likelihood frequency domain estimation of the channel response of a channel between at least one transmitting peer and at least one receiving peer, according to the invented method, are presented.

In a first embodiment a device at a receiving peer comprising means for capturing $N_U$ reference tones, transmitted from a transmitting peer to said receiving peer and means for determining at said receiving peer from said $N_U$ reference tones said maximum likelihood frequency domain estimate of said channel response at $N_F$ predetermined frequencies by directly exploiting the finiteness of the time response of said channel.

Said means for capturing comprises of circuitry typically found in a receiver, such as an antenna, a low noise power amplifier, a bandpass filter, an analog-digital converter. In a further embodiment said means include a time synchronization circuit, a FFT/IFFT circuit and a symbol reordering block.

Said means for determining said maximum likelihood frequency domain estimate comprises of a digital circuit capable of executing the necessary computations and storage devices for storing predetermined and intermediate computated values. Said digital circuit can be a general purpose programmable circuit or a dedicated custom designed hardware block or a combination of both.

Figure 9:
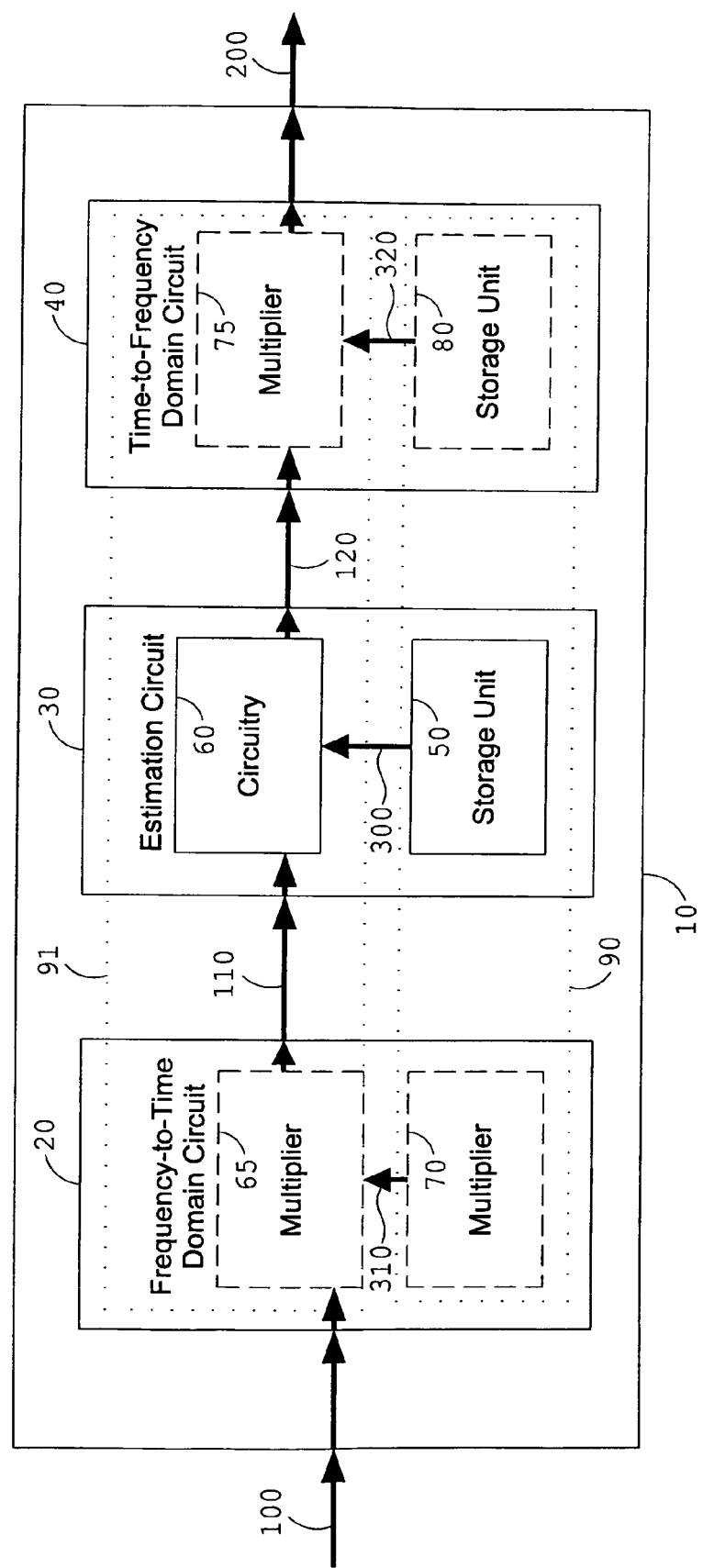
FIG. 9 shows a three step approach digital circuit (10) for determining at said receiving peer from $N_U$ received reference tones (100) said maximum likelihood frequency domain estimate (200) of said channel response at $N_F$ predetermined frequencies by directly exploiting the finiteness of the time response of said channel.

FIG. 9 shows a digital circuit (10) for determining at said receiving peer from $N_U$ received reference tones (100) said maximum likelihood frequency domain estimate (200) of said channel response at $N_F$ predetermined frequencies by directly exploiting the finiteness of the time response of said channel. Said digital circuit (10) comprises a frequency-to-time domain circuit (20) for transforming said received reference tones in time domain measurements (110); an estimation circuit (30) for determining from said time domain measurements maximum likelihood time domain estimates (120); and a time-to-frequency domain circuit (40) for transforming said maximum likelihood time domain estimates in frequency domain for obtaining said maximum likelihood frequency domain estimate. Said estimation circuit (30) comprises a storage device (50), being capable of storing a $N_H$ by $N_H$ weighting matrix, being essentially different from the identity matrix, with $N_H$ the length of said finite time response; and circuitry (60) such as a plurality of multipliers for making linear combinations of said time domain measurements thereby using coefficients (300) from said weighting matrix. In an embodiment said circuits (20)

and (40) comprise IFFT and FFT circuits. In another embodiment said circuits (20) and (40) also comprise of storage units (70), (80) and computation circuitry such as a plurality of multipliers (65), (75), using stored information (310), (320). Note that said storage devices can define one big memory (90). Also part of said multipliers (65), (60), (75) can be shared (91) for executing the computations. Said frequency-to-time domain circuits (20) outputs are connected logically to said estimation circuits (30) inputs and said estimation circuit (30) outputs are connected logically to said time-to frequency domain circuits (40) inputs.

From the formula $H=F(F_{uh}{}^H F_{uh})^{-1} F_{uh} \, y_u$, one can derive the operations of the frequency-to-time circuit (20), performing Fuh, either via a partial FFT or via multiplication with the appropriate matrix, of the estimation circuit (30), performing the inverse matrix, via multiplication and of the time-to-frequency circuit (40), performing F.

In said memory (70) in FIG. 9, at least the matrix Fuh is stored. In said memory (80) in FIG. 9, at least the matrix F is stored. In memory (50) at least the non-identity matrix, being the inverse of the product of the Hermitian inverse of Fuh and Fuh, is stored. Potentially said matrices are stored in a single memory structure (90). Said banks of multipliers (65), (60), (65) can be a single bank (91) of multipliers or at least share some of the multipliers.

Figure 10:
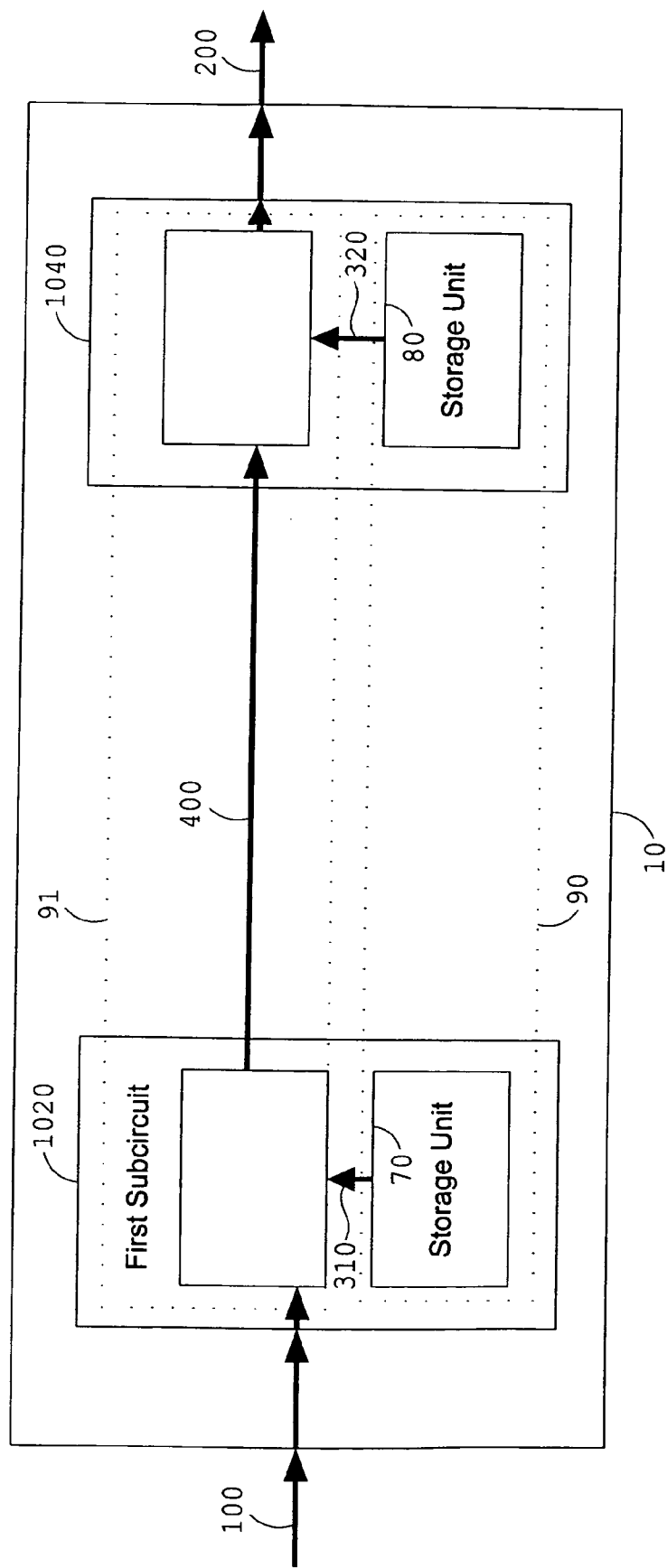
FIG. 10 shows a digital circuit implementing a two-step approach comprises a first subcircuit (1020) transforming said received reference tones (100) into an intermediate results (400); and a second subcircuit (1040) transforming said intermediate result (400) into said maximum likelihood frequency domain estimates (200).

FIG. 10 shows a digital circuit implementing a two-step approach comprises a first subcircuit (1020) transforming said received reference tones (100) into an intermediate results (400); and a second subcircuit (1040) transforming said intermediate result (400) into said maximum likelihood frequency domain estimates (200). Said first subcircuits (1020) outputs, carrying said intermediate results (400) are logically connected to said second subcircuits (1040) inputs.

From equation (14) one can derive the operation of the first subcircuit (1020), performing the operation of Hermitian inverse of V and the second subcircuit (1040), performing the operation of V itself.

In an embodiment said circuit for transforming said reference tones in time domain measurements comprises a plurality of multipliers for multiplying a partial $N_H$ by $N_U$ IFFT matrix with said reference tones with $N_H$ the length of said finite time response.

In an embodiment said circuit for transforming said reference tones in time domain measurements comprises a partial $N_H$ by $N_U$ IFFT transform circuit with $N_H$ the length of said finite time response.

In an embodiment said circuit for transforming said maximum likelihood time domain estimates into said maximum likelihood frequency domain estimate comprises a plurality of multipliers for multiplying a partial $N_F$ by $N_H$ FFT matrix with said maximum likelihood time domain estimates.

In an embodiment said circuit for transforming said maximum likelihood time domain estimates into said maximum likelihood frequency domain estimate comprises a partial $N_F$ by $N_H$ FFT transform circuit.

In an embodiment said circuit for determining from said time domain measurements maximum likelihood time domain estimates comprises a storage device, being capable of storing a $N_H$ by $N_H$ weighting matrix, being essentially different from the identity matrix, with $N_H$ the length of said finite time response and circuitry for making linear combinations of said time domain measurements thereby using coefficients from said weighting matrix.

In an embodiment said digital circuit (10) for determining at said receiving peer from $N_U$ received reference tones said maximum likelihood frequency domain estimate of said channel response at $N_F$ predetermined frequencies comprises a plurality of multipliers for multiplying a $N_F$ by $N_U$ matrix with said reference tones.

Note that power-optimized FFT circuitry, as disclosed in U.S. Ser. No. 09/613,181, now U.S. Pat. No. 6,591,284, can be used for said FFT and IFFT circuits needed for the channel estimation and preferably also for the FFT block in the reference tone capturing means.

What is to be claimed is:

1. A method of determining a maximum likelihood frequency domain estimate of the channel response of a channel between at least one transmitting peer and at least one receiving peer, said method comprising:

transmitting $N_U$ reference tones from said transmitting peer to said receiving peer; capturing said $N_U$ reference tones at said receiving peer; and determining at said receiving peer from said $N_U$ reference tones said maximum likelihood frequency domain estimate of said channel response at $N_F$ predetermined frequencies by directly exploiting the finiteness of the time response of said channel, wherein said determining of said maximum likelihood frequency domain estimate comprises:

transforming said reference tones in time domain measurements;

determining from said time domain measurements maximum likelihood time domain estimates; and transforming said maximum likelihood time domain estimates in frequency domain for obtaining said maximum likelihood frequency domain estimate.

2. The method of claim 1, wherein said act of transforming said reference tones in time domain measurements comprises multiplying a partial $N_H$ by $N_U$ IFFT matrix with said reference tones with $N_H$ the length of said finite time response.

3. The method of claim 2, wherein the columns of said partial IFFT matrix are selected from a $N_C$ by $N_C$ IFFT matrix according to said reference tones and the rows of said partial IFFT matrix are selected from said $N_C$ by $N_C$ IFFT matrix according to the non-zero time samples of the impulse response of said channel.

4. The method of claim 1, wherein said act of transforming said reference tones in time domain measurements comprises performing a partial $N_H$ by $N_U$ IFFT transformation on said reference tones with $N_H$ the length of said finite time response.

5. The method of claim 1, wherein said act of transforming said maximum likelihood time domain estimates into said maximum likelihood frequency domain estimate comprises multiplying a partial $N_F$ by $N_H$ FFT matrix with said maximum likelihood time domain estimates.

6. The method of claim 5, wherein the columns of said partial FFT matrix are selected from a $N_C$ by $N_C$ FFT matrix according to the non-zero time samples of the impulse response of said channel and the rows of said partial FFT matrix are selected from said $N_C$ by $N_C$ FFT matrix according to said $N_F$ predetermined frequencies.

7. The method of claim 1, wherein said act of transforming said maximum likelihood time domain estimates into said maximum likelihood frequency domain estimate being based on performing a partial $N_F$ by $N_H$ FFT transformation to said maximum likelihood time domain estimates.

8. The method of claim 1, wherein said determining from time domain measurements maximum likelihood time domain estimates is performed by solving a least squares estimation problem.

9. The method of claim 1, wherein said maximum likelihood time domain estimates comprises linear combinations of said time domain measurements.

10. The method of claim 9, wherein said linear combinations are defined by a $N_H$ by $N_H$ weighting matrix with $N_H$ the length of said finite time response.

11. The method of claim 10, wherein said weighting matrix is essentially different from the identity matrix.

12. The method of claim 1, wherein said act of transforming from frequency domain to time domain, said act of determining of said maximum likelihood estimate and said act of transforming from time domain to frequency domain being performed directly by multiplying a $N_F$ by $N_U$ matrix with said reference tones.

13. The method of claim 12, wherein direct determining of said maximum likelihood estimate of said channel from said reference tones is performed by solving a constrained least squares problem.

14. A method of determining a maximum likelihood frequency domain estimate of the channel response of a channel between at least one transmitting peer and at least one receiving peer, said method comprising:
    transmitting $N_U$ reference tones from said transmitting peer to said receiving peer;
    capturing said $N_U$ reference tones at said receiving peer; and
    determining at said receiving peer from said $N_U$ reference tones said maximum likelihood frequency domain estimate of said channel response at $N_F$ predetermined frequencies by directly exploiting the finiteness of the time response of said channel, wherein said determining of said maximum likelihood frequency domain estimate comprises:
    determining an intermediate result by multiplying a partial weighted $N_H$ by $N_U$ IFFT matrix with said reference tones with $N_H$ the length of said finite time response: and
    multiplying said intermediate result with a partial weighted $N_F$ by $N_H$ FFT matrix, to thereby obtain said maximum likelihood frequency domain estimates.

15. The method of claim 14, wherein the weighting of said IFFT and FFT matrix is substantially similar to a weighting matrix.

16. A method of determining a maximum likelihood frequency domain estimate of the channel response of a channel between at least one transmitting peer and at least one receiving peer, said method comprising:
    capturing $N_U$ reference tones at said receiving peer; and
    determining at said receiving peer from said $N_U$ reference tones said maximum likelihood frequency domain estimate of said channel response at $N_F$ predetermined frequencies by directly exploiting the finiteness of the time response of said channel, wherein at least part of said reference tones are not equidistantly spaced apart, and wherein said determining of said maximum likelihood frequency domain estimate comprises:
    transforming said reference tones in time domain measurements;
    determining from said time domain measurements maximum likelihood time domain estimates; and
    transforming said maximum likelihood time domain estimates in frequency domain for obtaining said maximum likelihood frequency domain estimate.

17. The method of claim 16, wherein said act of transforming said reference tones in time domain measurements comprises performing a partial $N_H$ by $N_U$ IFFT transformation on said reference tones with $N_H$ the length of said finite time response.

18. The method of claim 16, wherein said act of transforming said maximum likelihood time domain estimates into said maximum likelihood frequency domain estimate comprises performing a partial $N_F$ by $N_H$ FFT transformation to said maximum likelihood time domain estimates.

19. The method of claim 16, wherein said maximum likelihood time domain estimates are linear combinations of said time domain measurements, said linear combinations are defined by a $N_H$ by $N_H$ weighting matrix with $N_H$ the length of said finite time response, whereby said weighting matrix is essentially different from the identity matrix.

20. A method of determining a maximum likelihood frequency domain estimate of the channel response of a channel between at least one transmitting peer and at least one receiving peer, said method comprising:
    capturing $N_U$ reference tones at said receiving peer; and
    determining at said receiving peer from said $N_U$ reference tones said maximum likelihood frequency domain estimate of said channel response at $N_F$ predetermined frequencies by directly exploiting the finiteness of the time response of said channel, wherein at least part of said reference tones are not equidistantly spaced apart, and wherein said determining of said maximum likelihood frequency domain estimate comprises:
    determining an intermediate result by multiplying a partial right-side weighted $N_H$ by $N_U$ IFFT matrix with said reference tones with $N_H$ the length of said finite time response; and
    multiplying said intermediate result with a partial left-side weighted $N_F$ by $N_H$ FFT matrix, to thereby obtain said maximum likelihood frequency domain estimates, wherein the weighting of said IFFT and FFT matrix is substantially similar to a weighting matrix.

21. A device at a receiving peer for determining a maximum likelihood frequency domain estimation of the channel response of a channel between at least one transmitting peer and at least one receiving peer comprising:
    a circuit configured to determine at said receiving peer from $N_U$ received reference tones said maximum likelihood frequency domain estimate of said channel response at $N_F$ predetermined frequencies by directly exploiting the finiteness of the time response of said channel, wherein said circuit comprises
    a frequency-to-time domain circuit configured to transform said received reference tones in time domain measurements;
    an estimation circuit configured to determine from said time domain measurements maximum likelihood time domain estimates; and
    a time-to-frequency domain circuit configured to transform said maximum likelihood time domain estimates in frequency domain for obtaining said maximum likelihood frequency domain estimate.

22. The device of claim 21, wherein said frequency-to-time domain circuit comprises:
    a plurality of multipliers configured to multiply a partial $N_H$ by $N_U$ IFFT matrix with said reference tones with $N_H$ the length of said finite time response; and
    a storage device, at least capable of storing said partial $N_H$ by $N_U$ IFFT matrix.

23. The device of claim 21, wherein said frequency-to-time domain circuit comprises a partial $N_H$ by $N_U$ IFFT transform circuit with $N_H$ the length of said finite time response.

24. The device of claim 21, wherein said time-to-frequency domain circuit comprises:
   a plurality of multipliers configured to multiply a partial $N_F$ by $N_H$ FFT matrix with said maximum likelihood time domain estimates; and
   a storage device, at least configured to store said partial $N_F$ by $N_H$ FFT matrix.

25. The device of claim 21, wherein said time-to-frequency domain circuit comprises a partial $N_F$ by $N_H$ FFT transform circuit.

26. The device of claim 21, wherein said estimation circuit comprises a storage device, being configured to store a $N_H$ by $N_H$ weighting matrix, being essentially different from the identity matrix, with $N_H$ the length of said finite time response; and circuitry configured to make linear combinations of said time domain measurements thereby using coefficients from said weighting matrix.

27. A device at a receiving peer for determining a maximum likelihood frequency domain estimation of the channel response of a channel between at least one transmitting peer and at least one receiving peer comprising:
   a circuit configured to determine at said receiving peer from $N_U$ received reference tones said maximum likelihood frequency domain estimate of said channel response at $N_F$ predetermined frequencies by directly exploiting the finiteness of the time response of said channel, wherein said circuit comprises:
   a first subcircuit configured to transform said received reference tone into an intermediate results; and
   a second subcircuit configured to transform said intermediate result into said maximum likelihood frequency domain estimates.

28. The device of claim 27, wherein said first subcircuit comprises:
   a plurality of multipliers configured to multiply a partial $N_H$ by $N_U$ weighted IFFT matrix with said reference tones with $N_H$ the length of said finite time response; and
   a storage device, at least capable of storing said partial weighted $N_H$ by $N_U$ IFFT matrix.

29. The device of claim 27, wherein said second subcircuit comprises:
   a plurality of multipliers configured to multiply a partial $N_F$ by $N_H$ weighted FFT matrix with said intermediate result with $N_H$ the length of said finite time response; and
   a storage device, at least configured to store said partial $N_F$ by $N_H$ weighted FFT matrix.

* * * * *

UNITED STATES PATENT AND TRADEMARK OFFICE
CERTIFICATE OF CORRECTION

PATENT NO. : 6,990,061 B2
APPLICATION NO. : 09/871571
DATED : January 24, 2006
INVENTOR(S) : Luc Deneire and Patric Vandenameele It is certified that error appears in the above-identified patent and that said Letters Patent is hereby corrected as shown below:

On Title Page Item (75)
On Page 1, Column 1 under Inventors, Line 2, delete "Vandenmeele" and insert -Vandenameele--, therefor.
On Title Page, Item (75)
On Page 1, Column 1 under Inventors, Line 2, delete "Leuven" and insert -Bertern--, therefor.
On Title Page Item (56)
On Page 1, Column 2 under Other Publications, Line 6, delete "Equalizaion" and insert -Equalization--, therefor.
In Column 1, Line 11, Delete "modem" and insert --modern--, therefor.
In Column 1, Line 28, Delete "Nc and insert --$N_c$--, therefor.
In Column 1, Line 37, Delete "modem" and insert --modern--, therefor.
In Column 2, Line 23, Delete "modem" and insert --modern--, therefor.
In Column 2, Line 55, Delete "modem" and insert --modern--, therefor.
In Column 4, Line 24, Delete "modem" and insert --modern--, therefor.
In Column 4, Line 31, Delete "modem" and insert --modern--, therefor.
In Column 6, Line 39, Delete "$X_M=[X_{O,m} ... X_{Nc-1,m,}]^T$" and insert -$X_m=[X_{0,m} ... X_{Nc-1,M}]^T$--, therefor.
In Column 7, Line 45, Delete "$N_{HE}$" and insert --$N_{he}$--, therefor.
In Column 7, Line 59, Delete "$r=F_{uh}^{\#}y_{u=}h+F_{uh}^{\#}$" and insert --$r=F^{\#}_{uh}y_u=h+F^{\#}_{uh}$--, therefor.
In Column 8, Line 2, Delete "$H_u=P_{Fuh}Y_u$" and insert -$H_u=P_{Fuh}y_u$--, therefor.
In Column 8, Line 18, Delete "Cu and CI" and insert --$C_u$ and $C_l$--, therefor.
In Column 8, Line 36, Delete "$P_sP_{Fish}=-C^{\#}_uP_{cl}C_lF_{lh}(F^H_{uh}F_{th})^{-1}F^H_{tsh}$" and insert --$P_SP_{Fuh}=-C^{\#}_uP_{cl}C_lF_{lh}(F^H_{uh}F_{uh})^{-1}F^H_{uh}$--, therefor.
In Column 8, Line 39, Delete "$C^{\#}_uC_uF_{tsh}F^{\#}_{uh}C^{\#}_uC_u$" and insert --$C^{\#}_uC_uF_{uh}F^{\#}_{uh}C^{\#}_uC_u$--, therefor.
In Column 8, Line 59, Delete "Fuh" and insert --$F_{uh}$--, therefor.
In Column 8, Line 67, Delete "Ps" and insert --$P_s$--, therefor.
In Column 9, Line 11, After "1999." Delete "[" and insert --]--, therefor.
In Column 9, Line 28, Delete "$N_{hee}$" and insert --$N_{he}$--, therefor.
In Column 10, Line 64, Delete "$N_{he}$-8" and insert --$N_{he}$=8--, therefor.
In Column 11, Line 23, Delete "09,505,228" and insert --09/505,228--, therefor.
In Column 13, Line 14, Delete "Fuh" and insert --$F_{uh}$--, therefor.
In Column 13, Line 18, Delete "Fuh" and insert --$F_{uh}$--, therefor.

UNITED STATES PATENT AND TRADEMARK OFFICE
CERTIFICATE OF CORRECTION

PATENT NO.        : 6,990,061 B2
APPLICATION NO. : 09/871571
DATED             : January 24, 2006
INVENTOR(S)       : Luc Deneire and Patric Vandenameele It is certified that error appears in the above-identified patent and that said Letters Patent is hereby corrected as shown below:

In Column 13, Line 22, Delete "Fuh and Fuh" and insert --$F_{uh}$ and $F_{uh}$--, therefor.
In Column 14, line 5, Delete "09,613,181" and insert --09/613,181--, therefor.

Signed and Sealed this

Twenty-eighth Day of November, 2006

JON W. DUDAS
*Director of the United States Patent and Trademark Office*